Patented June 9, 1936

2,043,564

UNITED STATES PATENT OFFICE 2,043,564

METHOD OF PREPARING ARTIFICIAL SPONGES

Leon Pierre Georges Vautier and René Fays, St.-Just-des-Marais, Oise, France, assignors to Comptoir des Textiles Artificiels, a corporation of France No Drawing. Application November 10, 1933, Serial No. 697,468. In France November 14, 1932

8 Claims. (Cl. 18—48)

This invention relates to the manufacture of porous objects of cellulosic material and particularly to artificial sponges.

Heretofore the preparation of artificial sponges and other porous objects from a cellulosic plastic mass has comprised the mixing of liquefiable solid substances and short fibers in a cellulosic solution, coagulating the resulting paste in a mold and thereafter extracting the liquefiable solid substances by dissolving them from the mass and finishing the porous mass in any suitable manner. The surface of the object thus obtained was more compact than the interior, the liquefiable solid substances which had served to form the pores having been forced to the interior of the mass in the molding operation and thus being unable to exercise a pore-forming function on the surface of the mass.

An object of the present invention is the preparation of artificial sponges or other porous objects of regenerated cellulose which have a porous surface structure. Other objects will appear hereinafter.

These objects are accomplished by the following invention wherein in the preparation of sponges from cellulose esters and particularly from viscose, the intimate mixture of viscose and a pore-forming material, or viscose, fiber, and a pore-forming material is coagulated in contact with an exterior layer of pore-forming material. Because the exterior of the plastic mass is coagulated in contact with compressed pore-forming material in place of being in contact with a smooth surfaced mold, the surface of the porous object formed can be just as porous as the interior of the object. The following example is given to illustrate the invention but it is not intended to be limitative thereof.

Example

While being cooled, 150 parts of high viscosity viscose which has been ripened for only a few hours and which, therefore, has a very high viscose index is mixed with from 600–1200 parts of crystallized sodium sulfate decahydrate. The crystals vary in size according to the dimensions of the pores desired, thus for a large pore crystals passing through a screen with 17 mm. meshes and remaining on a screen with 8 mm. meshes may be used. For smaller pores crystals passing through a screen with 8 mm. meshes and remaining on a screen with 4 mm. meshes may be used. To this mixture from 5–9 parts of hemp fiber cut into short length, for example from 1–4 cm., and, if desired, a suitable quantity of dyestuff are thoroughly incorporated by mixing, for example in a dough kneader, for a suitable time, for example from 15–30 minutes, at a temperature of approximately room temperature, for example 15–16° C. The resulting paste is cast by hand or mechanically into blocks of any suitable form and dimensions. For sponges a spherical or oval form is often desired. These blocks are placed in a strong mold the bottom of which has been previously lined with crystals of about the same composition and size as those entering the mixer. The interstices around the blocks of plastic mass are filled with the same crystals and the filling continued until the blocks are covered. The mass is then subjected to pressure by means of a press and the mold and its contents are placed in a chamber into which steam, hot air, or a hot saline solution is admitted. The crystals melt, the mass coagulates, and when the operation is finished the sponges are then pressed in order to recover the saline solution. The spongy masses are then treated with sulfuric acid and subsequently bleached if desired.

In preparing artificial sponges we prefer to use a high viscosity viscose such as is produced by steeping wood pulp or other suitable cellulosic material in a caustic soda solution containing from 230–240 g. of sodium hydroxide per liter for about an hour and a half at about 21° C. and then pressing the alkali cellulose thus formed until its weight is approximately 2.8 times the dry weight of the cellulose. This alkali cellulose is then shredded for about three hours at from 20–25° C. and, without aging, 40 kg. of this alkali cellulose is xanthated with 8.5 liters of carbon disulfide for four hours at a temperature of from 24–38° C. The resulting cellulose xanthate is dissolved in caustic and water to give a solution containing about 8.2–8.9% cellulose and 4.5–5.2% sodium hydrate. The final viscosity of the viscose solution is from 7200–10,000 C. G. S. units.

While the invention consists in the step of coagulating the mixture of cellulose ester and a pore-forming material in contact with an exterior layer of pore-forming material, variations in the procedure of preparing the mixture are known to the prior art. Thus, instead of sodium sulfate decahydrate crystals other crystals or amorphous material which melts or dissolves easily may be used. Various materials such as paraffin, stearin, sugar, and salts rich in water of crystallization have been thus disclosed. In general, alkali metal salts containing water of crystallization and readily fusible are suitable, thus sodium acetate trihydrate, sodium carbonate decahydrate, trisodium phosphate dodecahydrate, disodium phosphate dodecahydrate, potassium sodium tartrate tetrahydrate, potassium fluoride dihydrate, and sodium thiosulfate pentahydrate. The crystals or other pore-forming material may also be selected in order to obtain various surface effects. Thus, irregular crystals may be used which will produce surface texture very similar to a natural sponge. If desired, the crystals may be so selected that the surface has a different texture from the interior of the spongy mass in order to improve the appearance, feel, etc. The hemp fibers likewise may be replaced by other textile materials such as linen, jute, cotton, and the like. The process applies to all sponge materials regardless of what the size and the composition of the mixture may be. While sponges are in general produced by the coagulation of viscose, they may also be prepared by the coagulation of other esters such as the nitrate or acetate or cellulose ethers such as ethyl or benzyl cellulose. The process of the present invention is, therefore, also applicable to these other cellulose derivatives.

Contrary to the normal cast sponges, the sponges obtained by the process of the present invention present a very open surface structure. Their appearance is more pleasing and the suction and expulsion of liquids is very much easier. By the process of the present invention a surface of appearance and porosity differing from those of the interior of the sponge may be obtained, a result not obtainable by the processes of the prior art. A further advantage and one of considerable economic importance is that there is little or no waste in the manufacture of these sponges inasmuch as the sponges are finished after the coagulation, regeneration, and bleaching steps, whereas the sponges of the prior art required a further treatment for maximum utility in the removal of the outer relatively less porous layer.

As many apparently widely different embodiments of this invention may be made without departing from the spirit and scope thereof, it is to be understood that we do not limit ourselves to the specific embodiments thereof except as defined in the appended claims.

We claim:

1. A process for the preparation of artificial sponges which comprises intimately mixing 150 parts by weight of high viscosity viscose with from 600-1200 parts by weight of sodium sulfate decahydrate and 5-9 parts by weight of hemp fiber, forming said mixture in molds, coagulating said molded mixture in contact with an exterior layer of sodium sulfate decahydrate, separating said sodium sulfate decahydrate from the sponges thus formed, treating said sponges with sulfuric acid, and thereafter bleaching said sponges.

2. In the process of preparing sponges from viscose the step which comprises coagulating an intimate mixture of viscose, a vegetable fiber, and sodium sulfate decahydrate in contact with an exterior layer of sodium sulfate decahydrate.

3. In the process of preparing sponges from viscose the step which comprises coagulating an intimate mixture of viscose, a vegetable fiber, and a pore-forming material in contact with an exterior layer of pore-forming material.

4. In the process of preparing sponges from viscose the step which comprises coagulating an intimate mixture of viscose and a pore-forming material in contact with an exterior layer of pore-forming material.

5. In the process of preparing porous objects from viscose the step which comprises coagulating a mixture of viscose and readily fusible alkali metal salt containing water of crystallization as a pore-forming material in contact with an exterior layer of pore-forming material.

6. In the process of preparing porous objects from cellulose esters the step which comprises coagulating an intimate mixture of a pore-forming material and a solution of cellulose ester in contact with an exterior layer of pore-forming material.

7. In the process of preparing porous objects from cellulose derivatives the step which comprises coagulating an intimate mixture of pore-forming material and a solution of cellulose derivative in contact with an exterior layer of pore-forming material.

8. In the process of preparing porous objects from cellulose ethers the step which comprises coagulating an intimate mixture of pore-forming material and a solution of cellulose ether in contact with an exterior layer of pore-forming material.

LEON PIERRE GEORGES VAUTIER.
RENÉ FAYS.